(12) United States Patent
Whitfill et al.

(10) Patent No.: US 10,035,941 B2
(45) Date of Patent: Jul. 31, 2018

(54) MULTI-MODAL PARTICLE SIZE DISTRIBUTION LOST CIRCULATION MATERIAL

(71) Applicant: Halliburton Energy Services, Inc., Houston, TX (US)

(72) Inventors: Donald L. Whitfill, Kingwood, TX (US); Matthew Lynn Miller, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/110,473

(22) PCT Filed: Feb. 18, 2014

(86) PCT No.: PCT/US2014/016950
§ 371 (c)(1),
(2) Date: Jul. 8, 2016

(87) PCT Pub. No.: WO2015/126368
PCT Pub. Date: Aug. 27, 2015

(65) Prior Publication Data
US 2016/0333247 A1 Nov. 17, 2016

(51) Int. Cl.
*C09K 8/03* (2006.01)
*C09K 8/035* (2006.01)
*C09K 8/516* (2006.01)

(52) U.S. Cl.
CPC ............ *C09K 8/032* (2013.01); *C09K 8/03* (2013.01); *C09K 8/035* (2013.01); *C09K 8/516* (2013.01);
(Continued)

(58) Field of Classification Search
None
See application file for complete search history.

(56) References Cited

U.S. PATENT DOCUMENTS 4,531,594 A * 7/1985 Cowan ................ C09K 8/035
175/72
5,861,362 A * 1/1999 Mayeux ............... C09K 8/035
175/72

(Continued)

FOREIGN PATENT DOCUMENTS

WO  WO 2014-008190 A1  1/2014

OTHER PUBLICATIONS

International Search Report and Written Opinion for PCT/US2014/016950 prepared by ISA/KR, dated Nov. 19, 2014, 12 pages.

*Primary Examiner* — John J Figueroa
(74) *Attorney, Agent, or Firm* — Haynes and Boone, LLP

(57) ABSTRACT

Compositions for lost circulation materials (LCM) and methods for using same in drilling and/or completing wellbores that help solve lost circulation problems in a wide range of fracture sizes, thereby advantageously eliminating the need for a variety of products for lost circulation in a field at any one time. The compositions provide specific LCM components in specific ratios that are analogs to lost circulation fractures and that yield superior performance in preventing or alleviating lost circulation in drilling and cementing boreholes. The compositions have a multi-modal particle size distribution (PSD) which provides a higher concentration of component materials in the same range of two or more fracture widths or median pore size diameters, thus allowing plugging to occur over a wider range than a single mode or narrow PSD.

18 Claims, 1 Drawing Sheet

(52) U.S. Cl.
CPC ...... *C09K 2208/04* (2013.01); *C09K 2208/08* (2013.01); *C09K 2208/18* (2013.01)

(56) References Cited

U.S. PATENT DOCUMENTS

| | | | |
|---|---|---|---|
| 7,284,611 | B2 | 10/2007 | Reddy et al. |
| 8,043,997 | B2 | 10/2011 | Whitfill et al. |
| 2006/0096759 | A1* | 5/2006 | Reddy ................ C09K 8/16 166/295 |
| 2006/0122071 | A1* | 6/2006 | Reddy ................ C09K 8/5045 507/219 |
| 2009/0029878 | A1* | 1/2009 | Bicerano ................ C09K 8/035 507/107 |
| 2012/0108472 | A1* | 5/2012 | Wu ................ C04B 18/022 507/112 |
| 2013/0228333 | A1 | 9/2013 | Miller |
| 2014/0014332 | A1 | 1/2014 | Savari et al. |
| 2014/0038857 | A1 | 2/2014 | Miller et al. |

* cited by examiner

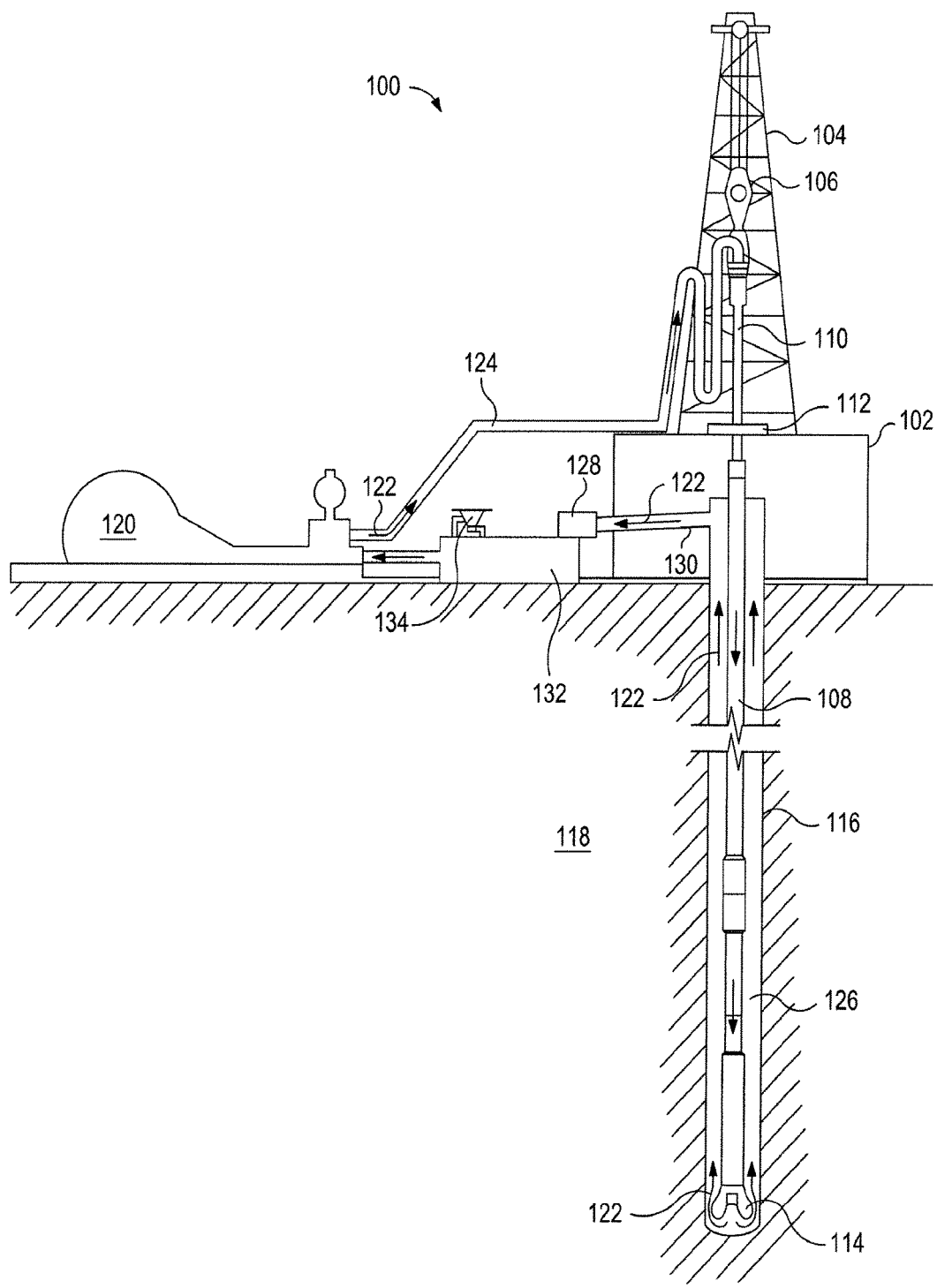

MULTI-MODAL PARTICLE SIZE DISTRIBUTION LOST CIRCULATION MATERIAL

FIELD OF THE INVENTION

The present embodiments generally relate to compositions and methods for drilling and completing boreholes in subterranean formations, particularly hydrocarbon bearing formations. More particularly, the present embodiments relate to solving lost circulation of drilling and completion fluids in a wide range of fracture sizes in subterranean formations.

BACKGROUND

The following paragraphs contain some discussion, which is illuminated by the innovations disclosed in this application, and any discussion of actual or proposed or possible approaches in this Background section does not imply that those approaches are prior art.

Natural resources such as oil and gas residing in a subterranean formation or zone are usually recovered by forming a wellbore that extends into the formation. The wellbore is drilled while circulating a drilling fluid therein. The drilling fluid is usually circulated downwardly through the interior of a drill pipe and upwardly through the annulus, which is located between the exterior of the pipe and the walls of the wellbore. After terminating the circulation of the drilling fluid, a string of pipe, e.g., casing, is run in the wellbore. Next, primary cementing is typically performed by pumping cement slurry into the annulus and allowing the cement to set into a hard mass (i.e., sheath). The cement sheath attaches the string of pipe to the walls of the wellbore and seals the annulus.

Often in drilling a wellbore, one or more pervious zones are encountered. The pervious zones may be, for example, highly permeable, unconsolidated, vugs, voids, naturally occurring fractures, or induced fractures that occur when weak zones have fracture gradients exceeded by the hydrostatic pressure of the drilling fluid or the cement slurry. During the drilling operation, the pervious or thief zones may result in the loss of drilling fluid. The drilling fluid flows into the thief zones rather than being returned to the surface, which reduces circulation of the drilling fluid. When circulation is lost, pressure on the open formation is reduced, which can result in an undesired zone flowing into the well or even catastrophic loss of well control.

A large variety of materials have been used or proposed in attempts to cure lost circulation. Generally, such materials are divided into four types or categories: fibrous materials, such as monofilament synthetic fibers; flaky materials, such as wood chips or mica flakes; granular materials, such as ground marble or petroleum coke; and settable compositions, the relative strength of which increases upon a pre-planned mode of triggering after placement, such as hydraulic cement.

Although many materials and compositions exist and have been proposed for preventing lost circulation, there continues to be a need for even more versatile and better compositions and methods for preventing, as well as mitigating, loss of circulation.

BRIEF DESCRIPTION OF THE DRAWING

The Figure depicts a schematic view of a wellbore drilling assembly, according to several exemplary embodiments.

DETAILED DESCRIPTION

It is to be understood that the following disclosure provides many different embodiments, or examples, of the present invention for implementing different features of various embodiments of the present invention. Specific examples of components are described below to simplify and exemplify the present disclosure. These are, of course, merely exemplary and are not intended to be limiting.

According to several exemplary embodiments, an improved lost circulation material (LCM) includes a combination of several materials to obtain a composition and a method for using such composition in drilling and/or completing wellbores that help solve lost circulation problems in a wide range of fracture sizes. According to several exemplary embodiments, the improved lost circulation material provides a logistical advantage of one product sufficing for a variety of lost circulation needs, eliminating the need to have a variety of products for lost circulation in the field at any one time.

According to several exemplary embodiments, the lost circulation material (LCM) composition has a multi-modal particle size distribution (PSD) design that provides a higher concentration of component materials in the same range of two or more fracture widths and/or pore sizes, thus allowing plugging to occur over a wider range, than would a single mode or narrow PSD design. According to several exemplary embodiments, the invention provides a broad particle size distribution so as to cover a range of fracture sizes with the same LCM combination.

According to several exemplary embodiments, the lost circulation material composition includes at least three sizes of a resilient graphitic carbon material such as STEEL-SEAL® material which is commercially available from Halliburton Energy Services, Inc. in Houston, Tex. and Duncan, Okla. According to several exemplary embodiments, the lost circulation material composition includes resilient graphitic carbon material selected from STEEL-SEAL® 1000 having a weight mean particle size ("d50") of about 1000±200 microns, STEELSEAL® 400 having a d50 of about 400±50 microns, STEELSEAL® 100 having a d50 of about 100±25 microns and STEELSEAL® 50 having a d50 of about 50±10 microns.

According to several exemplary embodiments, the lost circulation material composition includes at least three sizes of a calcium carbonate material such as BARACARB® sized-calcium carbonate which is commercially available from Halliburton Energy Services, Inc. in Houston, Tex. and Duncan, Okla. According to several exemplary embodiments, the lost circulation material composition includes sized-calcium carbonate material selected from BARACARB® 1200 having a d50 of about 1200±100 microns, BARACARB® 600 having a d50 of about 600±100 microns, BARACARB® 400 having a d50 of about 400±50 microns, BARACARB® 150 having a d50 of about 150±25 microns, BARACARB® 50 having a d50 of about 50±10 microns, and BARACARB® 25 having a d50 of about 25±5 microns.

According to several exemplary embodiments, the lost circulation material composition includes at least three sizes of a resilient graphitic carbon material and at least three sizes of a calcium carbonate material. For example, a suitable composition includes STEELSEAL® 1000, STEELSEAL® 400, and STEELSEAL® 100 as well as BARACARB® 1200, BARACARB® 600, and BARACARB® 150. According to several exemplary embodiments, the distribution of the STEELSEAL particles is about 20 to about 30% of STEELSEAL® 1000 particles, about 15 to about 20% of STEELSEAL® 400 particles, and about 10 to about 15% of STEELSEAL® 100 particles. According to several exemplary embodiments, the distribution of the BARACARB particles is about 20 to about 30% of BARACARB® 1200 particles, about 15 to about 20% of BARACARB® 600 particles, and about 10 to about 15% of BARACARB® 150 particles.

According to several exemplary embodiments, the concentration of the lost circulation material in a drilling fluid may range from about 10 pounds per barrel to about 120 pounds per barrel.

According to several exemplary embodiments, the proportions of the components may vary but in one embodiment the formulation includes resilient carbon material to calcium carbonate material in a ratio ranging from about 1:1 to about 1:2, with a resilient graphitic carbon material distribution of 10 to 30% by weight fine, 30 to 40% by weight medium, and 30 to 60% by weight coarse and with a calcium carbonate material distribution of 10 to 30% by weight fine, 30 to 40% by weight medium and 30 to 60% by weight coarse.

According to several exemplary embodiments, the lost circulation material composition may include at least two types of nut shell or corn cob particles. Suitable nut shells include walnut, pecan, peanut, cashew, brazil nut, chestnut, pistachio and almond shells in fine, medium or coarse grades. For instance, suitable nut shells have the following size distributions:
 fine grade: about 50 microns to about 2,000 microns
 medium grade: about 100 microns to about 3,000 microns
 coarse grade: about 100 microns to about 4,000 microns
Suitable examples of corn cob particles are corn cob 5/8 and corn cob 8/14. The designation "5/8" in connection with corn cob particles means that the particles have a size between 5 U.S. mesh and 8 U.S. mesh or between 2360 microns and 4000 microns. The designation "8/14" in connection with corn cob particles means that the particles have a size between 8 U.S. mesh and 14 U.S. mesh or between 1410 microns and 2360 microns.

According to several exemplary embodiments, the lost circulation material composition includes at least two sizes of a resilient graphitic carbon material, at least two sizes of a calcium carbonate material, and at least two types of nut shells or corn cob particles. For example, a suitable composition includes STEELSEAL® 1000, STEELSEAL® 400, BARACARB® 1200, BARACARB® 150, pecan shells coarse and corn cob 5/8. Yet another suitable composition includes STEELSEAL® 1000, STEELSEAL® 400, BARACARB® 600, BARACARB® 50, pecan shells medium and corn cob 8/14.

According to several exemplary embodiments, the concentration of the lost circulation material in a drilling fluid may range from about 10 pounds per barrel to about 120 pounds per barrel.

According to several exemplary embodiments, the proportions of the components may vary but in one embodiment the formulation includes resilient carbon material to calcium carbonate material to pecan shell medium to corn cob in a ratio ranging from about 4:3:2:1 to about 10:5:4:1 with a resilient graphitic carbon material distribution of 10 to 20% by weight fine and 20 to 30% by weight medium and a calcium carbonate distribution of 10 to 20% by weight fine and 20 to 30% by weight medium.

According to several exemplary embodiments, the lost circulation material composition is at least 80% soluble in typical wellbore acids such as hydrochloric acid and acetic acid. According to several exemplary embodiments, such acid soluble compositions include several sizes of a calcium carbonate material as well as one or more of an extrusion spun fiber also known as magma fiber, flaked calcium carbonate, and sized oyster shell particles. The aforementioned magma fiber and flaked calcium carbonate are commercially available from Halliburton Energy Services, Inc. in Houston, Tex. and Duncan, Okla. under the trade names "N-SEAL" and "Baraflake", respectively. For example, a suitable composition includes BARACARB® 1200, BARACARB® 600, BARACARB® 150 and BARACARB® 25 as well as oyster shell coarse and magma fiber. Table 1 below shows formulations for two embodiments of suitable acid soluble lost circulation material compositions.

TABLE 1

| ACID SOLUBLE FORMULATIONS | | |
|---|---|---|
| Formulation (wt %) | #1 | #2 |
| BARACARB ® 25 | 5 | 5 |
| BARACARB ® 150 | 10 | 10 |
| BARACARB ® 600 | 10 | 10 |
| BARACARB ® 1200 | 15 | 15 |
| Oyster Shell coarse | 30 | 37.5 |
| N-SEAL | 30 | 22.5 |

The lost circulation material properties of the acid soluble formulations set forth in Table 1 were tested at a concentration of 90 pounds per barrel in a particle plugging apparatus at a pressure of 1000 psi in accordance with the American Petroleum Institute (API) procedure for testing lost circulation materials that is set forth in standard Recommended Practice 13B-1 Annex J. The results from these tests are shown in TABLE 2 below.

TABLE 2

| FLUID LOSS FOR ACID SOLUBLE FORMULATIONS | | |
|---|---|---|
| Slot Width microns | Formulation 1 @90 ppb | Formulation 2 @90 ppb |
| Fluid loss (mL) to 1000 psi for 15 min @ 150° F. | | |
| 1016µ | 8 mL | 10.5 mL |
| 1524µ | 13.5 mL | 13 mL |
| 2032µ | 15 mL | 19 mL |
| 2540µ | 26.5 mL | 28.5 mL |
| tapered | 5.5 mL | 36 mL |

According to several exemplary embodiments, the lost circulation material composition is stable at high temperatures of up to about 600° F. According to several exemplary embodiments, such high temperature formulations include several sizes of a resilient graphitic carbon material, several sizes of a calcium carbonate material, as well as oyster shell particles or carbon fiber particles. For example, a suitable composition includes STEELSEAL® 1000 (coarse) STEELSEAL® 400 (medium), STEELSEAL® 100 (fine), BARACARB® 1200 (coarse), BARACARB® 150 (medium), BARACARB® 50 (fine) as well as oyster shell particles. Another suitable composition includes STEELSEAL® 1000 (coarse) STEELSEAL® 400 (medium), STEELSEAL® 100 (fine), BARACARB® 1200 (coarse), BARACARB® 150 (medium), BARACARB° 50 (fine) as well as 3mm carbon fiber.

Table 3 below shows formulations for two embodiments of high temperature lost circulation material compositions. The components of formulations 1 and 2 are set forth as a percent by weight of the formulation except for the carbon fiber which is included at the rate of 1 pound per barrel.

TABLE 3

HIGH TEMPERATURE FORMULATIONS

| Formulation (wt %) | #1 | #2 |
|---|---|---|
| BARACARB ® 50 | 4 | 12 |
| BARACARB ® 150 | 6 | 12 |
| BARACARB ® 1200 | 30 | 36 |
| STEELSEAL ® 100 | 4 | 4 |
| STEELSEAL ® 400 | 8 | 8 |
| STEELSEAL ® 1000 | 28 | 27 |
| Oyster Shell coarse | 20 | |
| Carbon fiber @ ppb | | 1 |

In operation, the lost circulation material is mixed with a carrier fluid, such as a drilling or completion fluid, to form a lost circulation pill and pumped into a wellbore penetrating a subterranean zone. Once the pill has been spotted into the thief zone, squeeze pressure from the surface causes the lost circulation pill to lose fluid quickly to the permeable formation or to the pervious fracture network. In some cases, the lost circulation material may form an immobile mass that gains both compressive and shear strength while in place in a fractured or other pervious zone and plugs the fractured or other pervious zone. The sealing mass quickly sets into a rigid sealing mass that is substantially impermeable to whole drilling fluid such that minimal subsequent drilling or treatment fluids pass into the fractured or other pervious zone.

The exemplary lost circulation material disclosed herein may directly or indirectly affect one or more components or pieces of equipment associated with the preparation, delivery, recapture, recycling, reuse and/or disposal of the disclosed lost circulation material. For example, and with reference to the Figure, the disclosed lost circulation material may directly or indirectly affect one or more components or pieces of equipment associated with an exemplary wellbore drilling assembly 100, according to one or more embodiments. It should be noted that while the Figure generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122, through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more components of the disclosed lost circulation material may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed components of the lost circulation material may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed components of the lost circulation material may be stored, reconditioned and/or regulated until added to the drilling fluid 122.

As mentioned above, the disclosed lost circulation material may directly or indirectly affect the components and equipment of the drilling assembly 100. For example, the disclosed lost circulation material may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger and any fluid reclamation equipment. The fluid processing unit(s) 128 may further include one or more sensors, gauges, pumps, compressors, and the like used to store, monitor, regulate and/or recondition the exemplary lost circulation material.

The disclosed lost circulation material may directly or indirectly affect the pump 120, which representatively includes any conduits, pipelines, trucks, tubulars and/or pipes used to fluidically convey the lost circulation material downhole, any pumps, compressors, or motors (e.g., topside or downhole) used to drive the lost circulation material into motion, any valves or related joints used to regulate the pressure or flow rate of the lost circulation material and any sensors (i.e., pressure, temperature, flow rate, etc.), gauges, and/or combinations thereof and the like. The disclosed lost circulation material may also directly or indirectly affect the mixing hopper 134 and the retention pit 132 and their assorted variations.

The disclosed lost circulation material may also directly or indirectly affect the various downhole equipment and tools that may come into contact with the lost circulation material such as, but not limited to, the drill string 108, any floats, drill collars, mud motors, downhole motors and/or pumps associated with the drill string 108 and any MWD/LWD tools and related telemetry equipment, sensors or distributed sensors associated with the drill string 108. The disclosed lost circulation material may also directly or indirectly affect any downhole heat exchangers, valves and corresponding actuation devices, tool seals, packers and other wellbore isolation devices or components and the like associated with the wellbore 116. The disclosed lost circulation material may also directly or indirectly affect the drill bit 114, which may include, but is not limited to, roller cone bits, PDC bits, natural diamond bits, any hole openers, reamers, coring bits, etc.

While not specifically illustrated herein, the disclosed lost circulation material may also directly or indirectly affect any transport or delivery equipment used to convey the lost circulation material to the drilling assembly 100 such as, for example, any transport vessels, conduits, pipelines, trucks, tubulars and/or pipes used to fluidically move the lost circulation material from one location to another, any pumps, compressors, or motors used to drive the lost circulation material into motion, any valves or related joints used to regulate the pressure or flow rate of the lost circulation material and any sensors (i.e., pressure and temperature), gauges, and/or combinations thereof and the like.

While the present invention has been described in terms of several exemplary embodiments, those skilled in the art will recognize that the invention can be practiced with modification within the spirit and scope of the appended claims.

The present disclosure has been described relative to several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of controlling lost circulation comprising:
   contacting a lost circulation zone in a subterranean formation with a multi-modal lost circulation composition consisting of:
   oyster shell particles;
   three portions of particles of a resilient graphitic carbon material, each portion of particles having a different weight mean particle size selected from about 1000 microns, about 400 microns, and about 100 microns; and
   three portions of particles of a sized-calcium carbonate material, each portion of particles having a different weight mean particle size selected from about 50 microns, about 150 microns, and about 1200 microns.

2. The method of claim 1, wherein the distribution of the three portions of particles of the resilient graphitic carbon material in the lost circulation composition is about 20 to about 30% of particles having a weight mean particle size of about 1000 microns, about 5 to about 20% of particles having a weight mean particle size of about 400 microns, and about 3 to about 15% of particles having a weight mean particle size of about 100 microns.

3. The method of claim 1, wherein the distribution of the three portions of particles of the sized-calcium carbonate material in the lost circulation composition is about 25 to about 40% of particles having a weight mean particle size of about 1200 microns, about 3 to about 20% of particles having a weight mean particle size of about 50 microns, and about 5 to about 15% of particles having a weight mean particle size of about 150 microns.

4. The method of claim 1, wherein the multi-modal lost circulation composition consists of resilient carbon material particles and sized-calcium carbonate particles in a ratio of from about 1:1 to about 1:2.

5. The method of claim 1, wherein the distribution of the three portions of particles of the resilient graphitic carbon material in the lost circulation composition is about 3 to about 5% of particles having a weight mean particle size of about 100 microns, about 5 to about 10% of particles having a weight mean particle size of about 400 microns, and about 25 to 30% of particles having a weight mean particle size of about 1000 microns.

6. The method of claim 1, wherein the distribution of the three portions of particles of the sized-calcium carbonate material in the lost circulation composition is about 3 to about 15% of particles having a weight mean particle size of about 50 microns, about 5 to about 15% of particles having a weight mean particle size of about 150 microns, and about 25 to about 40% of particles having a weight mean particle size of about 1200 microns.

7. The method of claim 1, wherein the oyster shells are present in the lost circulation composition in an amount of about 20% by weight of the lost circulation composition.

8. A method of controlling lost circulation comprising:
   contacting a lost circulation zone in a subterranean formation with a multi-modal lost circulation composition consisting of:
   carbon fiber particles; and
   six portions of particles, each portion of particles having a different weight mean particle size;
   wherein three of the portions of particles having a different weight mean particle size comprise resilient graphitic carbon material particles having a weight mean particle size selected from about 1000 microns, about 400 microns, and about 100 microns;
   wherein three of the portions of particles having a different weight mean particle size comprise a sized-calcium carbonate material having a weight mean particle size selected from about 1200 microns, about 150 microns, and about 50 microns.

9. The method of claim 8, wherein the distribution of the three portions of particles of the resilient graphitic carbon material in the lost circulation composition is about 3 to about 15% of particles having a weight mean particle size of about 100 microns, about 5 to about 20% of particles having a weight mean particle size of about 400 microns, and about 20 to about 30% of particles having a weight mean particle size of about 1000 microns.

10. The method of claim 9, wherein the distribution of the three portions of particles of the resilient graphitic carbon material in the lost circulation composition is about 3 to about 5% of particles having a weight mean particle size of about 100 microns, about 5 to about 10% of particles having a weight mean particle size of about 400 microns, and about 25 to 30% of particles having a weight mean particle size of about 1000 microns.

11. The method of claim 8, wherein the distribution of the three portions of particles of the sized-calcium carbonate material in the lost circulation composition is about 3 to about 20% of particles having a weight mean particle size of about 50 microns, about 5 to about 15% of particles having a weight mean particle size of about 150 microns, and about 25 to about 40% of particles having a weight mean particle size of about 1200 microns.

12. The method of claim 11, wherein the distribution of the three portions of particles of the sized-calcium carbonate material in the lost circulation composition is about 3 to about 15% of particles having a weight mean particle size of about 50 microns, about 5 to about 10% of particles having a weight mean particle size of about 150 microns, and about 30 to about 40% of particles having a weight mean particle size of about 1200 microns.

13. The method of claim 8, wherein the carbon fiber particles are present in the lost circulation composition in an amount of about 1 pound per barrel and comprise 3 mm carbon fiber particles.

14. A lost circulation material composition, consisting of:
oyster shell particles or carbon fiber particles;
three portions of particles of a resilient graphitic carbon material, each portion of particles having a different weight mean particle size selected from about 1000 microns, about 400 microns and about 100 microns; and
three portions of particles of a sized-calcium carbonate material, each portion of particles having a different weight mean particle size selected from about 50 microns, about 150 microns, and about 1200 microns.

15. The lost circulation material composition of claim 14, wherein the distribution of the three portions of particles of the resilient graphitic carbon material in the lost circulation composition is about 3 to about 15% of particles having a weight mean particle size of about 100 microns, about 5 to about 20% of particles having a weight mean particle size of about 400 microns, and about 20 to about 30% of particles having a weight mean particle size of about 1000 microns.

16. The lost circulation material composition of claim 15, wherein the distribution of the three portions of particles of the resilient graphitic carbon material in the lost circulation composition is about 3 to about 5% of particles having a weight mean particle size of about 100 microns, about 5 to about 10% of particles having a weight mean particle size of about 400 microns, and about 25 to 30% of particles having a weight mean particle size of about 1000 microns.

17. The lost circulation material composition of claim 14, wherein the distribution of the three portions of particles of the sized-calcium carbonate material in the lost circulation composition is about 3 to about 20% of particles having a weight mean particle size of about 50 microns, about 5 to about 15% of particles having a weight mean particle size of about 150 microns, and about 25 to about 40% of particles having a weight mean particle size of about 1200 microns.

18. The lost circulation material composition of claim 17, wherein the distribution of the three portions of particles of the sized-calcium carbonate material in the lost circulation composition is about 3 to about 15% of particles having a weight mean particle size of about 50 microns, about 5 to about 10% of particles having a weight mean particle size of about 150 microns, and about 30 to about 40% of particles having a weight mean particle size of about 1200 microns.

* * * * *